Patented Jan. 28, 1941

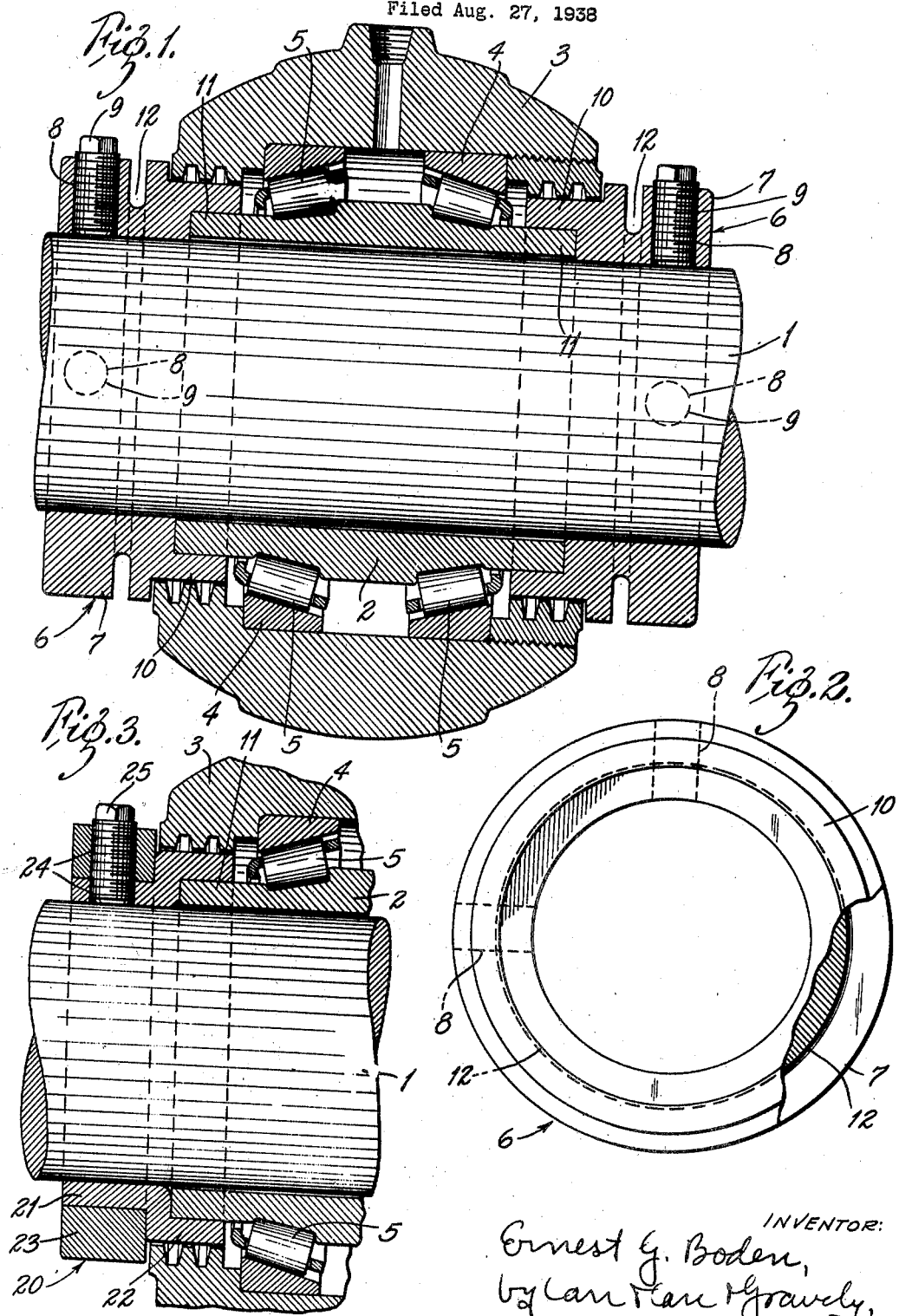

2,230,045

UNITED STATES PATENT OFFICE 2,230,045

BEARING MOUNTING

Ernest G. Boden, Canton, Ohio, assignor to The Timken Roller Bearing Company, Canton, Ohio, a corporation of Ohio Application August 27, 1938, Serial No. 227,082

5 Claims. (Cl. 287—52.07)

My invention relates to the mounting of bearings, particularly in such devices as pillow blocks. It is common practice to secure the inner bearing member to such devices in position by means of a collar secured to the shaft by a set screw and overlapping a portion of the bearing member. It is quite difficult to prevent the set screws of such locking collars from loosening thereby causing the bearing member to become loose on the shaft. The principal object of the present invention is to provide a bearing mounting in which the locking collar remains firmly secured to the shaft.

The invention consists principally in a locking collar for such constructions, wherein sufficient flexibility is provided in said collar adjacent to the bearing member to accommodate movement due to flexing of the shaft. The invention further consists in the bearing mounting and in the parts and combinations and arrangements of parts hereinafter described and claimed.

In the accompanying drawing,

Fig. 1 is a longitudinal sectional view of a pillow block having a bearing mounting embodying my invention, Fig. 2 is an end view of the locking collar; and Fig. 3 is a sectional view of a modified form of locking collar.

In the drawing is illustrated a pillow block including a shaft 1, a double row cone 2 or inner bearing member thereon, a housing 3, bearing cups 4 in said housing, taper bearing rollers 5 between the cups 4 and the respective raceways of said bearing cone 2 and locking collars for said bearing cone indicated generally by 6.

Each locking collar comprises an annular body portion 7 provided with threaded holes 8 in which are mounted set screws 9 that engage the shaft 1 and a projecting sleeve portion 10 that overlaps and fits closely on a cylindrical portion 11 on the end of said bearing cone 2. Adjacent to the attached end of said projecting sleeve 10, the body of said locking collar is provided with a peripheral groove or slot 12, which extends radially inward almost in line with the inner periphery of said projecting sleeve 10.

Said deep slot 12 in the locking collar 6 permits a certain amount of flexing or yielding of the locking collar. Thus any flexing of the shaft 1 is accommodated by flexing of the collar and the loosening effect on the set screws 9 is minimized. The bore of the cone 2 may be large enough as shown in Fig. 1 to leave a clearance between the cone and the shaft, the cone 2 being supported solely in said collars 6.

In the modified construction shown in Fig. 3, the locking collar 20 includes a fairly light stamping 21 having an offset sleeve portion 22 overlapping the bearing and a heavy ring 23 press-fitted on the outer end portion of said stamping 21, the threaded holes 24 for the set screws 25 extending through said ring 23 and said stamping 21. In this construction the angular sectional shape of the stamping 21 itself and the comparatively light metal from which the stamping is made provide the necessary flexibility.

Obviously numerous changes may be made without departing from the invention and I do not wish to be limited to the precise construction shown.

What I claim is:

1. A roller bearing mounting or the like comprising a shaft, an annular member on said shaft and a locking collar secured to said shaft and having a portion overlapping the end portion of said annular member, said collar having a peripheral groove extending radially inward from the periphery of said collar and being deep enough to impart flexibility to said collar.

2. A roller bearing mounting or the like comprising a shaft, an annular member on said shaft and a locking collar secured to said shaft and having a portion overlapping the end portion of said annular member, the bore of said annular member being larger than said shaft and said collar having a peripheral groove extending radially inward from the periphery of said collar and being deep enough to impart flexibility to said collar.

3. A roller bearing mounting or the like comprising a shaft, an annular member on said shaft and a locking collar secured to said shaft, said collar having a projecting sleeve portion of larger inside diameter than the bore of said collar overlapping the end portion of said annular member, said collar having a peripheral groove extending radially inward from the periphery of said collar near the attached end of said sleeve, said groove being deep enough to impart flexibility to said collar.

4. A roller bearing mounting or the like comprising a shaft, an annular member and a locking collar secured to said shaft, said collar having a projecting sleeve portion of larger inside diameter than the bore of said collar overlapping the end portion of said annular member, said collar having a peripheral groove near the attached end of said sleeve, said groove extending radially inward from the periphery of said collar and being so deep as to overlap the zone of said sleeve and provide flexibility to said collar.

5. A roller bearing mounting or the like comprising a shaft, an annular member and a locking collar secured to said shaft, said collar having a projecting sleeve portion of larger inside diameter than the bore of said collar overlapping the end portion of said annular member, the bore of said annular member being larger than said shaft and said collar having a peripheral groove extending radially inward from the periphery of said collar near the attached end of said sleeve adapted to provide flexibility to said collar.

ERNEST G. BODEN.